United States Patent
Halla-Aho et al.

(10) Patent No.: US 8,667,122 B2
(45) Date of Patent: Mar. 4, 2014

(54) METHOD AND APPARATUS FOR MESSAGE ROUTING OPTIMIZATION

(75) Inventors: Tero Mikael Halla-Aho, Oulu (FI); Petri Tapani Liimatta, Oulu (FI); Matti Juhani Oikarinen, Oulu (FI); Juha Petri Hartikainen, Oulu (FI); Kristian Andreas Luoma, Kiviniemi (FI); Markku Kalevi Vimpari, Oulu (FI)

(73) Assignee: Nokia Corporation, Espoo (FI)

( * ) Notice: Subject to any disclaimer, the term of this patent is extended or adjusted under 35 U.S.C. 154(b) by 379 days.

(21) Appl. No.: 12/487,184

(22) Filed: Jun. 18, 2009

(65) Prior Publication Data

US 2010/0325260 A1     Dec. 23, 2010

(51) Int. Cl.
*G06F 15/173* (2006.01)

(52) U.S. Cl.
USPC .......................................... 709/224; 709/200

(58) Field of Classification Search
USPC ............... 709/224, 227, 200; 718/105; 726/5; 711/147
See application file for complete search history.

(56) References Cited

U.S. PATENT DOCUMENTS

| | | | |
|---|---|---|---|
| 6,052,439 A | 4/2000 | Gerszberg et al. |
| 6,160,795 A | 12/2000 | Hosemann |
| 6,711,157 B1 | 3/2004 | Tang et al. |
| 7,085,814 B1 | 8/2006 | Gandhi et al. |
| 7,110,393 B1 | 9/2006 | Tripathi et al. |
| 7,123,656 B1 | 10/2006 | Reznik |
| 7,185,076 B1 | 2/2007 | Novaes et al. |
| 7,349,980 B1 | 3/2008 | Darugar et al. |
| 7,376,092 B2 | 5/2008 | Yajnik et al. |
| 7,545,805 B2 | 6/2009 | Huang et al. |
| 7,551,926 B2 | 6/2009 | Rune |
| 7,627,603 B2 | 12/2009 | Rosenblum et al. |
| 7,680,804 B2 | 3/2010 | Upendran et al. |
| 7,809,813 B2 | 10/2010 | Ma et al. |
| 7,899,905 B2 | 3/2011 | Rahman et al. |
| 7,904,951 B1 | 3/2011 | Ebrahimi et al. |
| 2002/0025781 A1 | 2/2002 | Saito |
| 2002/0035621 A1 | 3/2002 | Zintel et al. |
| 2002/0069157 A1 | 6/2002 | Jordan |
| 2002/0075296 A1 | 6/2002 | Soen et al. |
| 2002/0165916 A1 | 11/2002 | Kitamura |
| 2004/0034767 A1 | 2/2004 | Robinson et al. |

(Continued)

FOREIGN PATENT DOCUMENTS

| | | |
|---|---|---|
| EP | 2031926 A1 | 3/2009 |
| WO | WO 2005/104477 A1 | 11/2005 |

(Continued)

OTHER PUBLICATIONS

Office action for related U.S. Appl. No. 12/487,197 dated Apr. 18, 2011, pp. 1-132.

(Continued)

*Primary Examiner* — El Hadji Sall
(74) *Attorney, Agent, or Firm* — Ditthavong Mori & Steiner, P.C.

(57) ABSTRACT

An approach is provided for optimizing message routing without repeatedly resolving a home location. A login request from a user equipment associated with a resource identifier is received. The user equipment is configured to operate within a network including a plurality of clusters. The resource identifier of the user equipment is modified to include home cluster information indicating a corresponding one of the clusters serving the user equipment.

18 Claims, 11 Drawing Sheets

(56) References Cited

U.S. PATENT DOCUMENTS

| | | |
|---|---|---|
| 2004/0078450 A1 | 4/2004 | Chen et al. |
| 2004/0255302 A1 | 12/2004 | Trossen |
| 2005/0021622 A1 | 1/2005 | Cullen |
| 2005/0198351 A1* | 9/2005 | Nog et al. ............ 709/232 |
| 2005/0246186 A1 | 11/2005 | Nikolov |
| 2005/0273518 A1 | 12/2005 | Patrick et al. |
| 2006/0036679 A1 | 2/2006 | Goodman et al. |
| 2006/0037036 A1 | 2/2006 | Min et al. |
| 2006/0098649 A1 | 5/2006 | Shay |
| 2006/0136256 A1 | 6/2006 | Roots et al. |
| 2006/0146991 A1 | 7/2006 | Thompson et al. |
| 2006/0155857 A1* | 7/2006 | Feenan et al. ............ 709/227 |
| 2007/0005711 A1 | 1/2007 | Hassounah et al. |
| 2007/0097994 A1 | 5/2007 | Samdadiya et al. |
| 2007/0237139 A1 | 10/2007 | Garcia-Martin et al. |
| 2008/0028450 A1 | 1/2008 | Zhao et al. |
| 2008/0086689 A1 | 4/2008 | Berkley et al. |
| 2008/0250213 A1* | 10/2008 | Holt ............ 711/159 |
| 2008/0285540 A1 | 11/2008 | Burckart et al. |
| 2008/0288458 A1 | 11/2008 | Sun et al. |
| 2008/0294794 A1 | 11/2008 | Darugar et al. |
| 2009/0010271 A1 | 1/2009 | Bachmann et al. |
| 2009/0100147 A1 | 4/2009 | Igarashi |
| 2009/0144405 A1 | 6/2009 | Tung et al. |
| 2009/0183254 A1 | 7/2009 | Franco et al. |
| 2009/0292809 A1 | 11/2009 | Park et al. |
| 2009/0319670 A1 | 12/2009 | Kang |
| 2010/0081432 A1 | 4/2010 | Alam |
| 2010/0185757 A1 | 7/2010 | Boberg et al. |
| 2010/0322236 A1 | 12/2010 | Vimpari et al. |
| 2010/0325260 A1 | 12/2010 | Halla-Aho et al. |

FOREIGN PATENT DOCUMENTS

| | | |
|---|---|---|
| WO | WO 2006/125474 A1 | 11/2006 |
| WO | WO 2007/104360 A1 | 9/2007 |
| WO | WO 2009/040351 A2 | 4/2009 |

OTHER PUBLICATIONS

Office action for related U.S. Appl. No. 12/489,985 dated Feb. 18, 2011, pp. 1-6.

International search report and written opinion for corresponding international application No. PCT/FI2010/050474 dated Sep. 28, 2010, pp. 1-13.

International search report and written opinion for corresponding international application No. PCT/FI2010/050289 dated Jun. 15, 2010, pp. 1-16.

Office action for related U.S. Appl. No. 12/487,192 dated Apr. 27, 2011, pp. 1-26.

Office Action for related U.S. Appl. No. 12/465,976 dated Jan. 5, 2012, pp. 1-34.

Office Action for related U.S. Appl. No. 12/487,192 dated Nov. 7, 2011, pp. 1-24.

Office Action for related U.S. Appl. No. 12/487,197 dated Oct. 17, 2011, pp. 1-32.

Final Rejection for related U.S. Appl. No. 12/465,976 dated Aug. 16, 2012, pp. 1-28.

Final Rejection for related U.S. Appl. No. 12/487,192 dated Apr. 13, 2012, pp. 1-23.

* cited by examiner

METHOD AND APPARATUS FOR MESSAGE ROUTING OPTIMIZATION

BACKGROUND

Service providers and device manufacturers are continually challenged to deliver value and convenience to consumers by, for example, providing compelling network services, applications, and content. Important differentiators in the industry are application and network services as well as the capabilities to support and scale these services. In particular, these applications and services can be optimized to communicate with clients in a way that scales geographically.

SOME EXAMPLE EMBODIMENTS

According to one embodiment, a method comprises receiving a login request from a user equipment associated with a resource identifier. The user equipment is configured to operate within a network including a plurality of clusters. The method also comprises modifying the resource identifier of the user equipment to include home cluster information indicating a corresponding one of the clusters serving the user equipment.

According to another embodiment, an apparatus comprising at least one processor, and at least one memory including computer program code, the at least one memory and the computer program code configured to, with the at least one processor, cause the apparatus to receive a login request from a user equipment associated with a resource identifier. The user equipment is configured to operate within a network including a plurality of clusters. The apparatus is also caused to modify the resource identifier of the user equipment to include home cluster information indicating a corresponding one of the clusters serving the user equipment.

According to another embodiment, a computer-readable storage medium carrying one or more sequences of one or more instructions which, when executed by one or more processors, cause an apparatus to receive a login request from a user equipment associated with a resource identifier. The user equipment is configured to operate within a network including a plurality of clusters. The apparatus is also caused to modify the resource identifier of the user equipment to include home cluster information indicating a corresponding one of the clusters serving the user equipment.

According to yet another embodiment, an apparatus comprises means for receiving a login request from a user equipment associated with a resource identifier. The user equipment is configured to operate within a network including a plurality of clusters. The apparatus also comprises means for modifying the resource identifier of the user equipment to include home cluster information indicating a corresponding one of the clusters serving the user equipment.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF PREFERRED EMBODIMENT

A method, apparatus, and computer software for efficiently resolving home locations of message users are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1A:
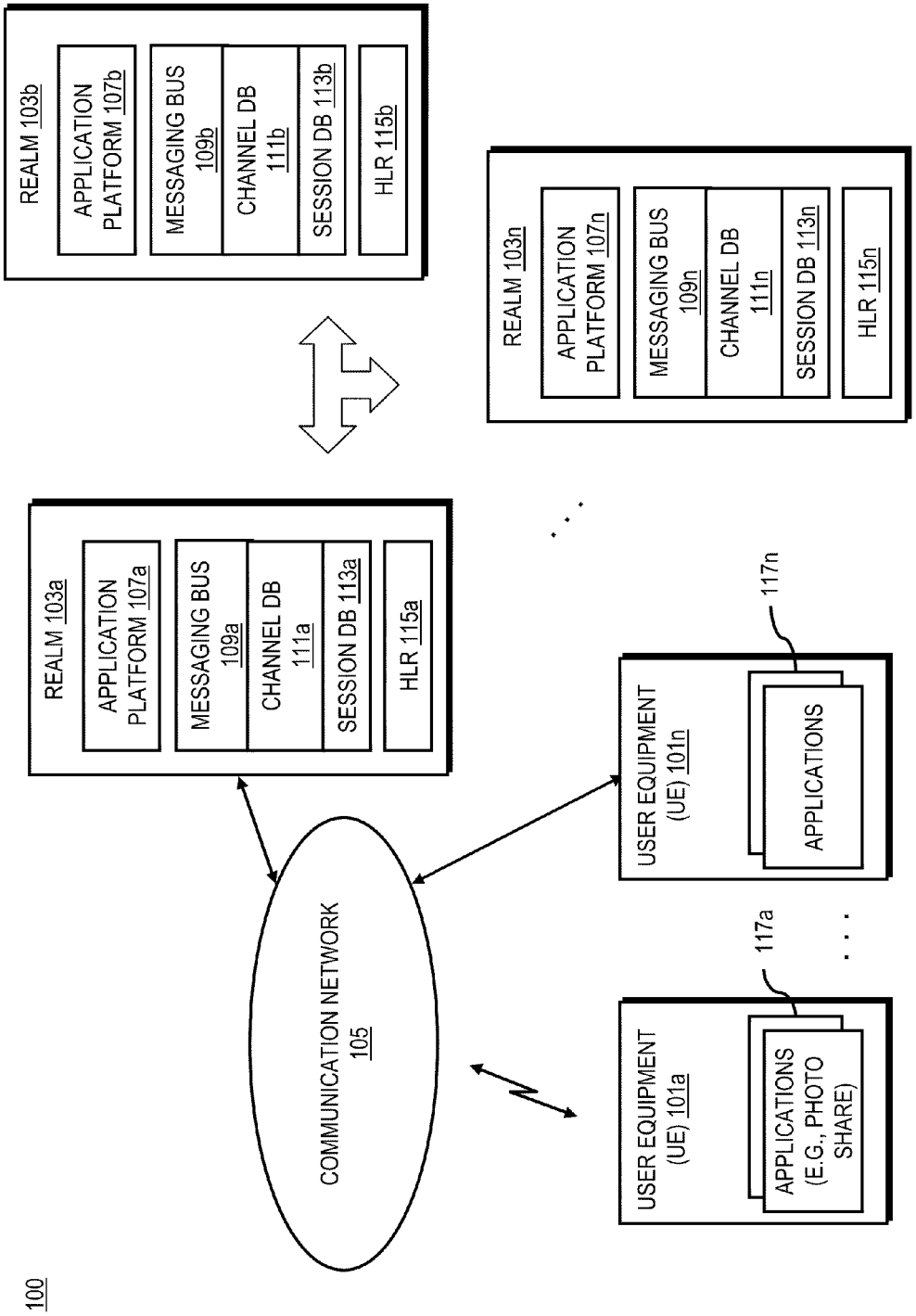
FIGS. 1A and 1B are diagrams of a messaging system capable of efficiently resolving home locations of users to geographic locations, according to various embodiments.
Figure 1B:
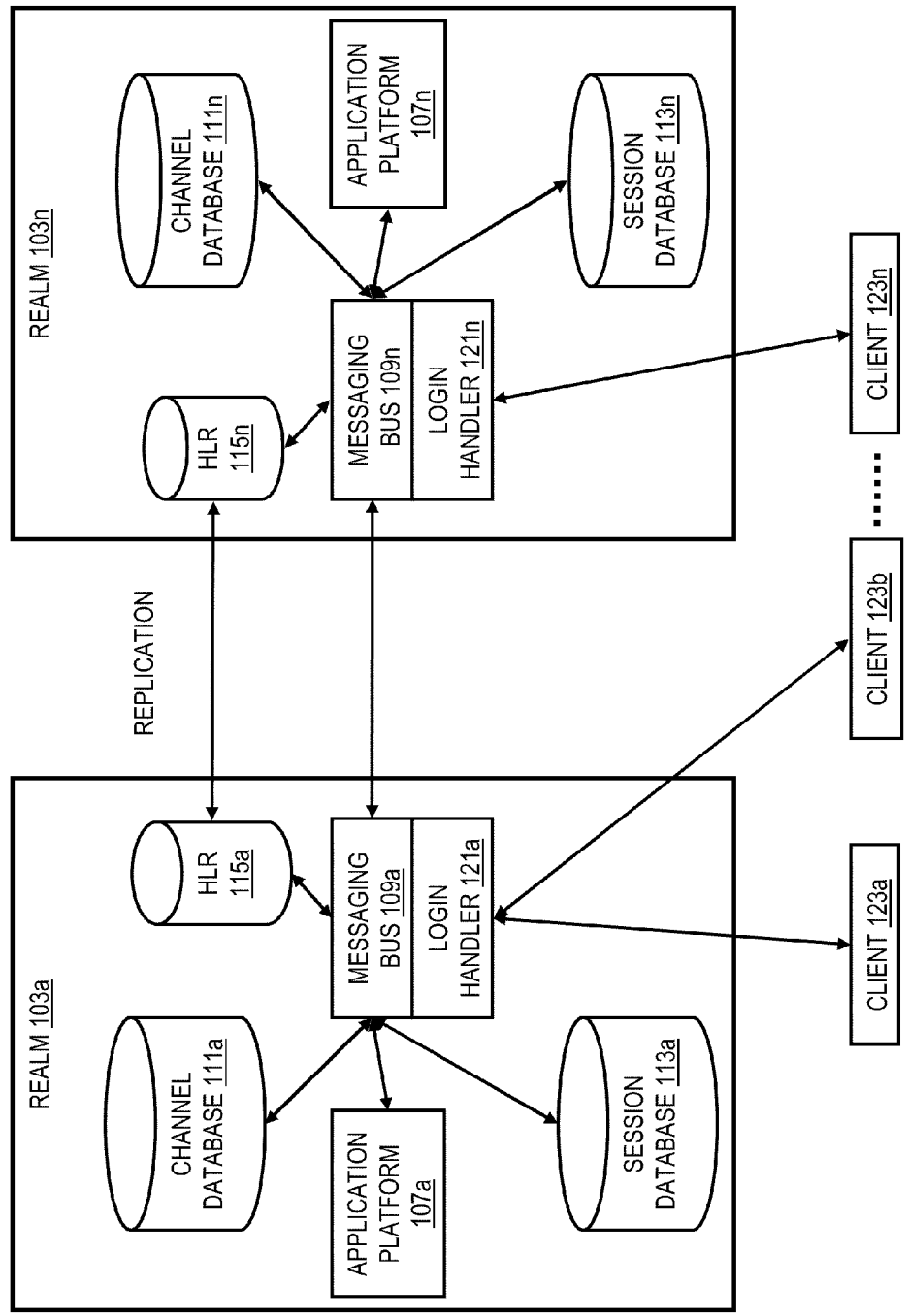

FIGS. 1A and 1B are diagrams of a messaging system capable of efficiently resolving home locations of users to geographic locations, according to various embodiments. For purposes of illustration, system 100 provides for the efficiency of publishing and subscribing to communication services on a user equipment (UEs) 101. As shown in FIG. 1A, system 100 comprises one or more user equipment, e.g., UEs 101*a*-101*n*, having connectivity to realms 103*a*-103*n* via a communication network 105. A realm 103 can be a geographically separated service site. The UEs 101 can connect to application platforms 107*a*-107*n* through this connection via a messaging bus 109*a*-109*n*, a channel database 111*a*-111*n*, a session database 113*a*-113*n*, and a home location registry (i.e., home locator) 115*a*-115*n*. According to certain embodiments, the application platforms 107 provide a number of services, which can include, for instance, mobile maps, music downloads, mobile games, photo sharing, file storage, synchronization of files with desktop computers, messaging etc. UE 101 applications 117 can utilize these services. Other applications and services can provide access to calendar and files wherever a user is, whether by mobile device, Internet café, or a home personal computer (PC). These applications and services can be optimized to communicate with additional applications and services in a way that can scale geographically through the use of a geographically distributed messaging bus 109.

In one embodiment, system 100, is a geographically distributed system, where each user or service has a home location. The geographical distribution allows for scalability of sending messages to many users quickly via a messaging bus 109. Thus, multiple subsystems are deployed at different realms 103. In one embodiment, a home location can be a cluster within a realm 103. Home location information can also include a node associated with a home cluster. A cluster can be a group linked computers acting to process information similar to a single computer. In some embodiments, a cluster is a realm 103. Each realm 103 should be able to communicate with other realms 103 to exchange messages between different end-points (e.g., users or services) located in different realms 103. To exchange messages between different endpoints in different realms 103, the messaging bus 109 should know the home location of the endpoints.

According to one embodiment, a user's home location can be resolved by querying a home location registry 115. The home location registry 115 can be a database containing the home messaging bus 109 address for each endpoint. Because the database should be simple and not regularly updated, the home location registry 115 can be stored in each realm 103 and each home location registry 115 instance can be updated each time one is modified. In another embodiment, each cluster, or a set of clusters can have its own instance of a home location registry 115. Querying a home location registry 115 each time a user sends a message may overload the system 100 or restrict the capacity of the system 100. In one embodiment, to ameliorate this issue, a home location resource identifier can be used to facilitate direct message routing between parties when a session has been established. The home location resource identifier can be appended to a user identifier uniquely identifying the user. When a session has been established, a session database 113 in each realm 103 involved in the session carries information regarding the session.

System 100, according to certain embodiments, utilizes a messaging bus 109 to provide efficient communications and services. A messaging bus 109 is a logical component that can connect applications and services running on application platforms 107. The messaging bus 109 transports the messages between applications. The messaging bus 109 uses a messaging scheme that is compatible with each of the applications. Also, the messaging bus 109 can have a set of common message commands and a common infrastructure for sending bus messages to receivers. When using a messaging bus 109, a sender application sends a message to the bus, the messaging bus 109 then transports the message to applications listening to the bus for the message.

Additionally, in certain embodiments, the messaging bus 109 can be associated with a publisher and subscriber messaging model where when a message is published, the message is sent to subscriber nodes. The publisher and subscriber model can include a list-based implementation, a broadcast-based implementation, or a content-based implementation. In a list-based subscription model, a list is maintained of publishing topics/subjects and subscribers/observers and notifying the subscribers/observers when an event occurs. In a broadcast-based model, a messaging bus 109 broadcasts the message to all of the nodes listening to the messaging bus 109 and the listening node (subscriber) filters unwanted messages. In the content-based model, when the messaging bus 109 receives a message, it matches the message against a set of subscribers and forwards the message to the appropriate subscribers. The producers and subscribers can be various applications and services. For example, a music news application in a realm 103 in Arizona can subscribe to a producer news service in a realm 103 in New York. In another example, a music application on a UE 101 can be a producer or subscriber.

In one embodiment, a publisher publishes a message via a channel on the messaging bus 109. The channel can be created and configured by a messaging bus 109 endpoint (e.g., a user application 117 or a service running on an application platform 107). The creator of the channel is the owner of the channel. In some embodiments, others users or services may publish or subscribe to the configured channel. Data about the configured channel can be stored in a channel database 111. Each channel database 111 contains publisher information and subscriber information of a channel. In one embodiment, if the channel owner home location is the current cluster, then information about all subscribers is stored in the channel database 111.

In another embodiment, the messaging bus 109 is used to send point-to-point messages within registered messaging bus 109 endpoints (e.g., a UE 101 or an application platform 107). Point-to-point messages do not use publish-and-subscribe channels to deliver messages, but the messages are routed between the endpoints via the messaging bus 109. For example, an application 117 on a UE 101 may send and receives messages to and from a service by using the messaging bus 109.

An application platform 107a can be used by a UE 101a application 117a to service a user's music, people, places, photo sharing, and other application services needs. In one embodiment, the application platform 107a can be used to access application platforms 107b-107n in different realms 103b-103n; these realms 103b-103n can be geographically dispersed. The application platforms 107b-107n in different realms 103b-103n can carry additional services, such as networks services, games, farming services, and video services. Further, services in realm 103a can access the services in realm 103b and realm 103n via a messaging bus 109. Realms 103 can also communicate over a service to service network.

In one embodiment, a realm 103 includes a login handler 121. A client 123 that wishes to send a message can be directed to the login handler 121 to initiate a session. A session is an interactive information exchange between communicating devices that is established at a certain time (e.g., login) and torn down at a later time (e.g., logout). Session information (e.g., identifier, name of applications associated with session, timestamp of the session's creation, etc.) can be stored in a session database 113. The login handler 121 can authenticate a client session. Additionally, the login handler 121 can examine a client identifier to determine the home location of the client 123. During the examination, the login handler 121 compares the identifier to a home location registry 115. The login handler 121 can also return a modified identifier to the client 123 that appends the home location of the client to the identifier. Thus, information in a home location registry 115 can be replicated into a modified identifier.

By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, mobile ad-hoc network (MANET), and the like.

The UE 101 is any type of mobile terminal, fixed terminal, or portable terminal including a mobile handset, station, unit, device, multimedia tablet, Internet node, communicator, desktop computer, laptop computer, internet computer, internet tablet, Personal Digital Assistants (PDAs), or any combination thereof. It is also contemplated that the UE 101 can support any type of interface to the user (such as "wearable" circuitry, etc.).

By way of example, the UE 101 and an application platform 107 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Figure 2:
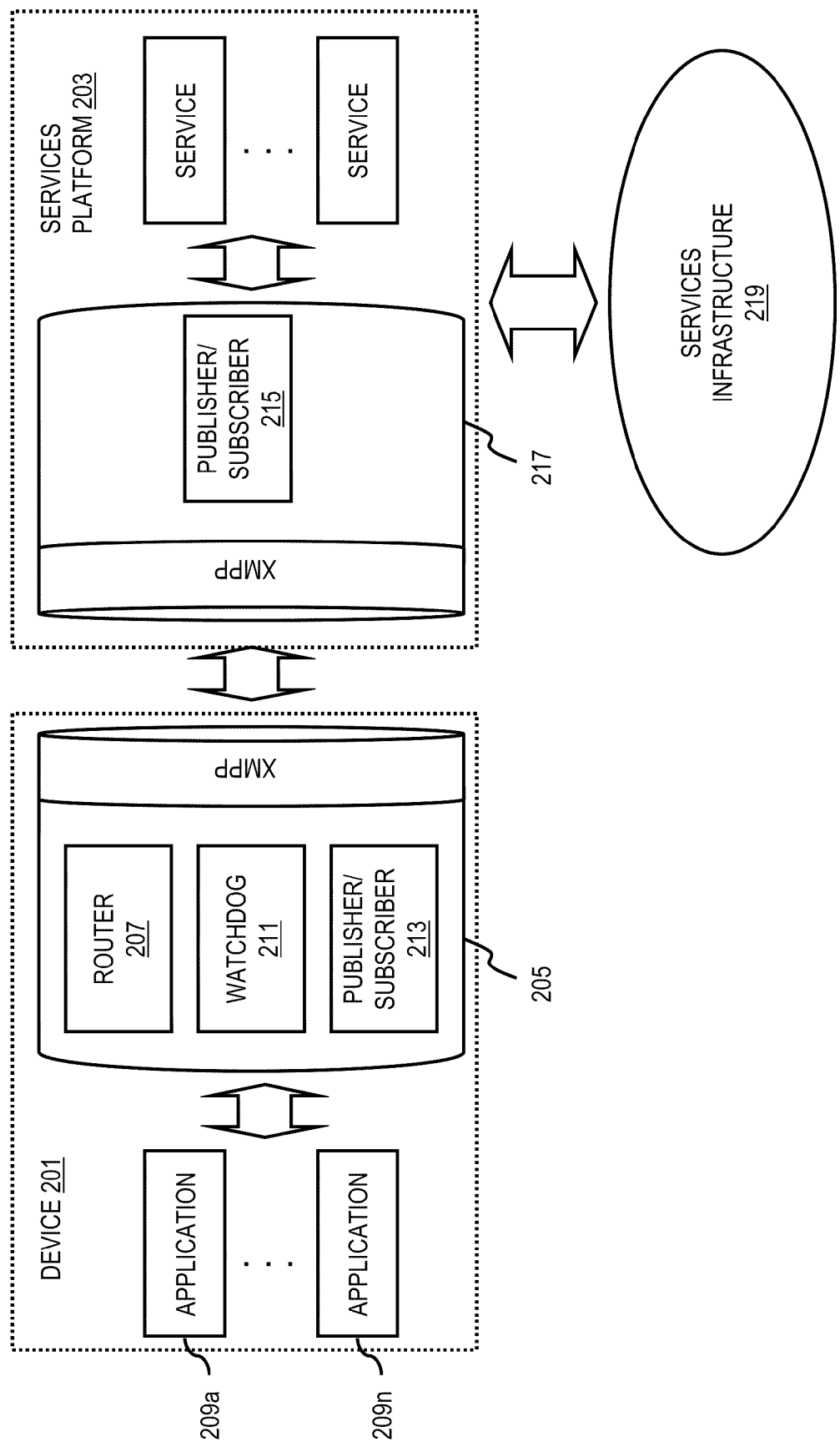
FIG. 2 is a diagram of the components of messaging buses within user equipment and services platform, according to one embodiment.

FIG. 2 is a system diagram of messaging buses within user equipment and services platform, according to various embodiments. A device 201, such as UE 101, can communicate with a services platform 203 via a client messaging bus 205. In this example, the device 201 runs applications that use the services provided by the services platform 203. The device 201 can send and receive messages with a services platform 203 through a protocol, such as Extensible Messaging and Presence Protocol (XMPP). In one embodiment, XMPP core routing is optimized without a messaging bus. In another embodiment, an XMPP core can be associated with the services platform 203. A client device messaging bus 205 can receive XMPP messages and route them by router 207 to the appropriate application 209a-209n. If the application 209 is not running, a watchdog module 211 launches the application 209, passing the message in the launch parameters. In certain embodiments, either the device 201 or the services platform 203 can be the publisher or subscriber 213 and 215. Services can communicate to a server side messaging bus 217 using a Representational State Transfer (REST) Application Programming Interface (API) or messaging bus agents. The services platform 203 can also communicate with a services infrastructure 219 using a REST API or messaging bus agents. The services infrastructure 219 can include enterprise services bus services using a different bus structure.

Figure 3:
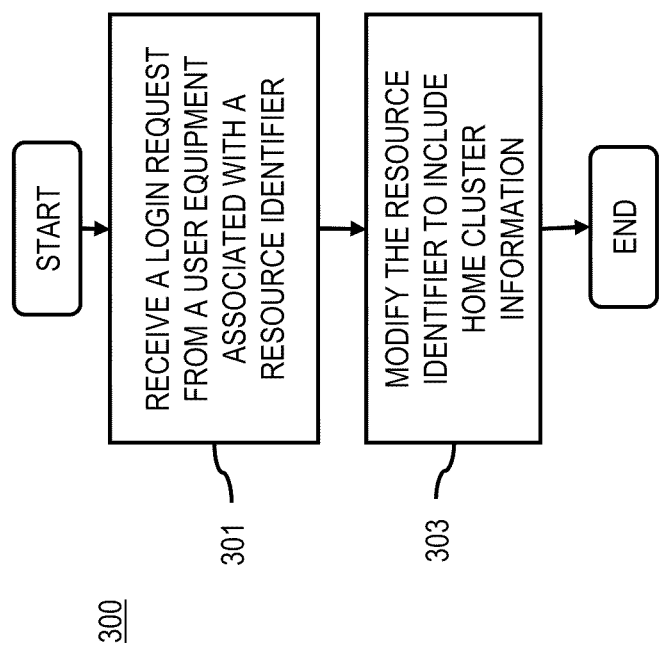
FIG. 3 is a flowchart of a process for efficiently resolving user home locations, according to one embodiment.

FIG. 3 is a flowchart of a process for efficiently resolving user home locations in a global messaging system, according to one embodiment. In one embodiment, the login handler 121 performs the process 300 and is implemented in, for instance, a chip set including a processor and a memory as shown FIG. 8. In one embodiment, the global messaging system can include XMPP stanza routing functionality. In another embodiment, the global messaging system can include a messaging bus 109. In one embodiment, a UE 101 (e.g., a computer, internet tablet, mobile device, etc.) initiates a request to send a message. At step 301, a login handler 121 associated with a messaging bus 109 receives the login request from the UE 101. The UE 101 is associated with a resource identifier and can be equipped to operate with a network including one or more clusters. In one embodiment, this request is used to initiate a point-to-point communication session between the UE 101 and an endpoint (e.g., another UE 101, a service, etc.).

At step 303, the login handler 121 modifies the resource identifier of the UE 101 to include home cluster information that indicates a cluster that serves the UE 101. In one embodiment, the home cluster information has a realm or site identifier, a cluster identifier, and a node identifier. The home cluster information is obtained by identifying the home cluster associated with a user of the UE 101 by using a home locator (e.g., querying a home location registry 115). The resource identifier is then modified by appending the home cluster information to the resource identifier. In one embodiment, the modified resource identifier is sent to the endpoint. The endpoint can then parse the modified resource identifier to determine the home location of the UE 101 instead of resolving the home location by querying the home location registry 115.

With the above approach, a geographically distributed system with multiple locations can be optimized to reduce overhead of repeatedly determining the home location of users. In this manner, a user associated with one geographic site can interact with another user associated with a different geographic site without the servers of both geographic sites having to query a home location registry. This helps alleviate the burden of a home location registry from repeated queries by clusters of computers for determining the home location of endpoints sending repeated messages.

Figure 4:
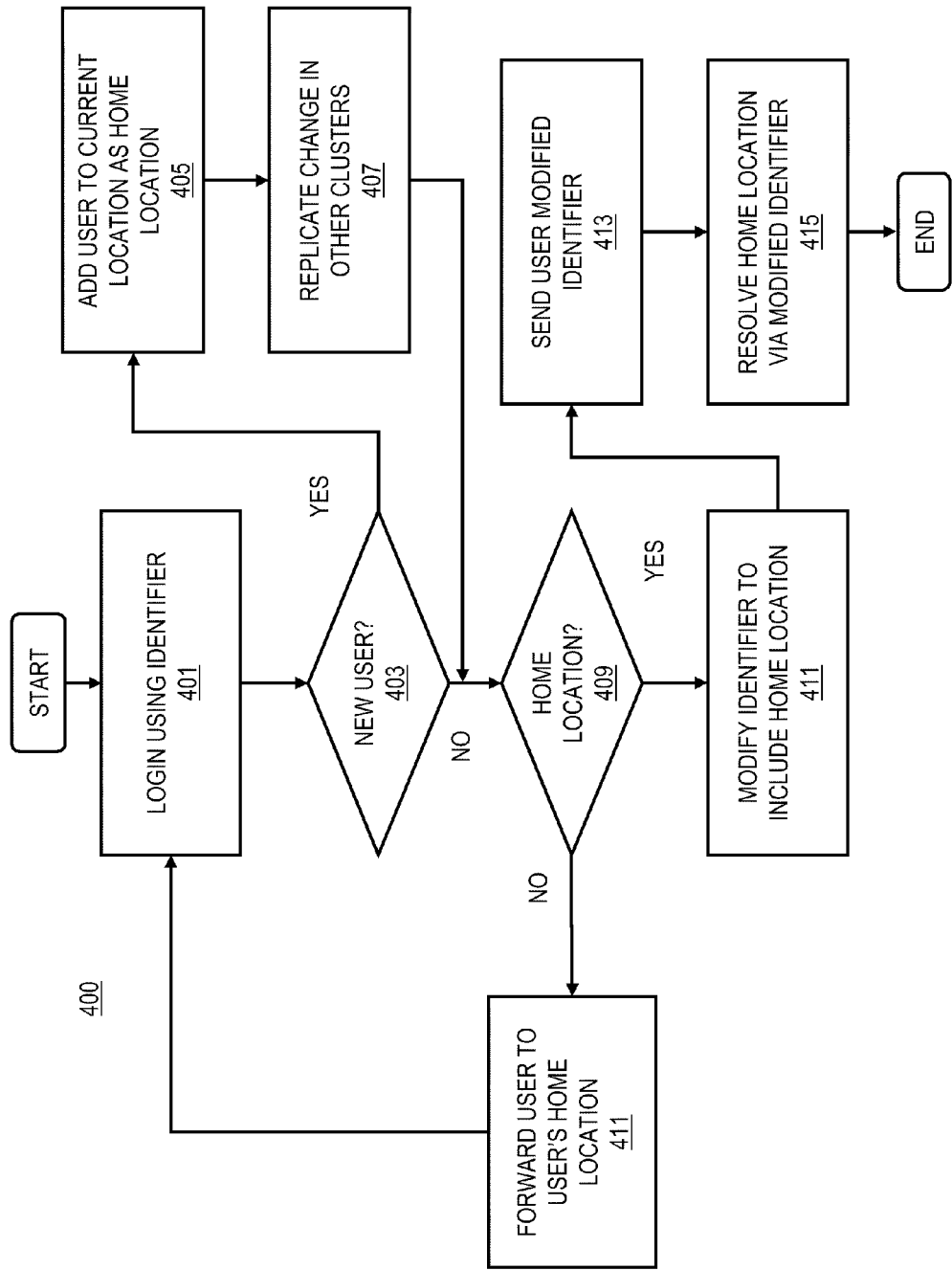
FIG. 4 is a flowchart of a process for efficiently resolving user home locations in a geographically distributed messaging system, according to one embodiment.

FIG. 4 is a flowchart of a process for efficiently resolving user home locations in a geographically distributed messaging system, according to one embodiment. In one embodiment, the login handler 121 performs the process 400 and is implemented in, for instance, a chip set including a processor and a memory as shown FIG. 8. In one embodiment, the geographically distributed messaging system comprises XMPP routing functionality. In another embodiment, the geographically distributed messaging system includes a messaging bus 109. In one embodiment, a client 123 (e.g., a computer, mobile device, or other UE 101) initiates a request to send a message. The client 123 can be directed to a local realm 103 by a domain name service (DNS) that resolves the internet protocol address of the client 123 to a rough geographic location that is associated with the realm 103. At step 401, client 123 connects to the local realm 103 and authenticates with a login handler 121 associated with the realm 103. At step 403, the login handler 121 determines if the client 123 has an existing identifier associated with the system 100. In one embodiment, the identifier is a jabber identity (JID). The determination can be accomplished by querying the client 123 for an identifier, if the client 123 does not return a proper identifier, a new user registration process is performed. At step 405, the client is issued an identifier and the home location of the identifier and the client is set to the current local realm 103. This information is updated in the home location registry 115. At step 407, the home location registry 115*a* updates home location registries 115*b*-115*n* of all of the other realms 103 or clusters. Once this is completed, the normal login process continues.

At step 409, the login handler 121 determines if the local realm 103 is the home location of the client 123. If the local realm 103 is not the home location of the client 123, at step 411, the client 123 is forwarded to the home location of the client 123. The login handler 121 accomplishes the task querying the home location registry 115 for the home location of the identifier associated with the client 123. Then, the home location registry 115 returns a home location for the identifier. If the home location is different from the home location of the login handler 121, the client 123 is forwarded to the login handler at the home location of the client 123. From there the process is started anew.

If, at step 409, the local realm 103 is determined to be the home location of the client 123, at step 411, the login handler 121 modifies the identifier associated with the client 123 to include the home location of the client 123. The login handler 121 then updates a session database 113 with client information and session information. At step 413, the client 123 is sent the modified identifier. In one embodiment, during the session, the home location is resolved by parsing the modified identifier rather than querying the home location registry 115.

With the above approach, a UE 101 can communicate with an endpoint without the home location of each communication message being resolved. In a geographically distributed system, it may be necessary to identify the end locations of a message using a home location registry. The home location registry's contents can be replicated into a modified identifier to help alleviate the load of multiple home location requests.

Figure 5:
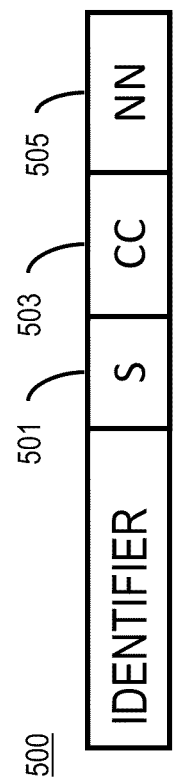
FIG. 5 is a diagram of a modified identifier, according to one embodiment.

FIG. 5 is a diagram of a modified identifier 500, according to one embodiment. In one embodiment, the identifier is a JID identifier. In another embodiment, the identifier includes a node identifier, a domain identifier, and a resource identifier. A domain identifier is a standard DNS hostname or network gateway. A node identifier represents the entity requesting and using network access provided by the DNS host or network gateway (e.g., the client 123). The resource identifier can represent a specific session, a connection, or an object. In one embodiment, a resource identifier portion of an identifier is modified to create the modified identifier. In this embodiment, the home location is appended to the end of the resource identifier. In one embodiment, the modified identifier includes a realm 103 or geographic site identifier (S) 501, a cluster identifier (CC) 503, and a node identifier (NN) 505. Each character of the identifiers can use characters [a-z], [A-Z], and [0-9]. This character set allows for 62 sites with 3844 clusters, each of which can have 3844 nodes. Thus, five characters can uniquely identify 916,132,832 nodes. In other embodiments, additional characters can be used for each identifier (e.g., the site identifier can be two characters, SS). This character set is compliant with XMPP Core character sets and thus the approach may be compatible with existing systems. In one embodiment, the size of a modified resource identifier should not exceed 1023 characters. In this embodiment, if appending the home location to the resource identifier would cause the modified resource identifier to exceed 1023 characters, the end characters of the original resource identifier would be overwritten.

Figure 6A:
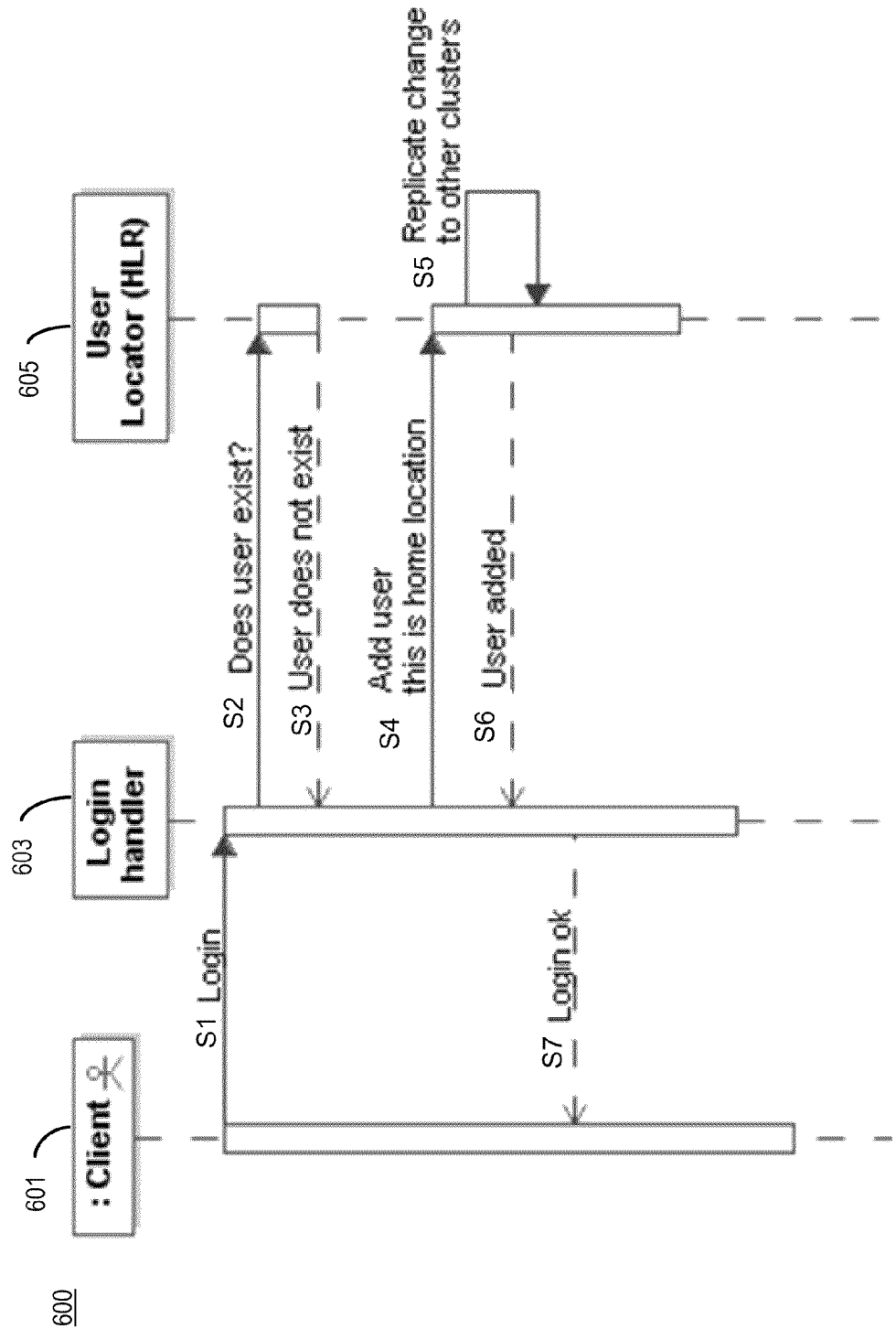
FIGS. 6A-6C are ladder diagrams for processes of resolving user home locations, according to various embodiments.

FIG. 6A is a ladder diagram 600 for a process of adding a client to a home location, according to one embodiment. Under this scenario, it is assumed that the client 601 is a new user. In step S1, the client 601 logs in to the login handler 603. The login handler 603 determines if the client 601 is an existing user, per step S2, by comparing a client identifier with a home location registry 605. In the case of a new user, the home location registry 605 returns a value to the login handler 603 notifying the login handler 603 that the user does not exist (step S3). In step S4, the login handler 603 then adds the user and updates the home location registry 605 to indicate that the home location of the login handler 603 is the home location of the client 601. Next, home location registry 605 then replicates the changes to all other home location registry 605 instances (step S5). After that, the home location registry 605 then notifies that the login handler 603 that the user has been added, per step S6. Then, the login handler 603 completes login of the client 601 (step S7).

Figure 6B:
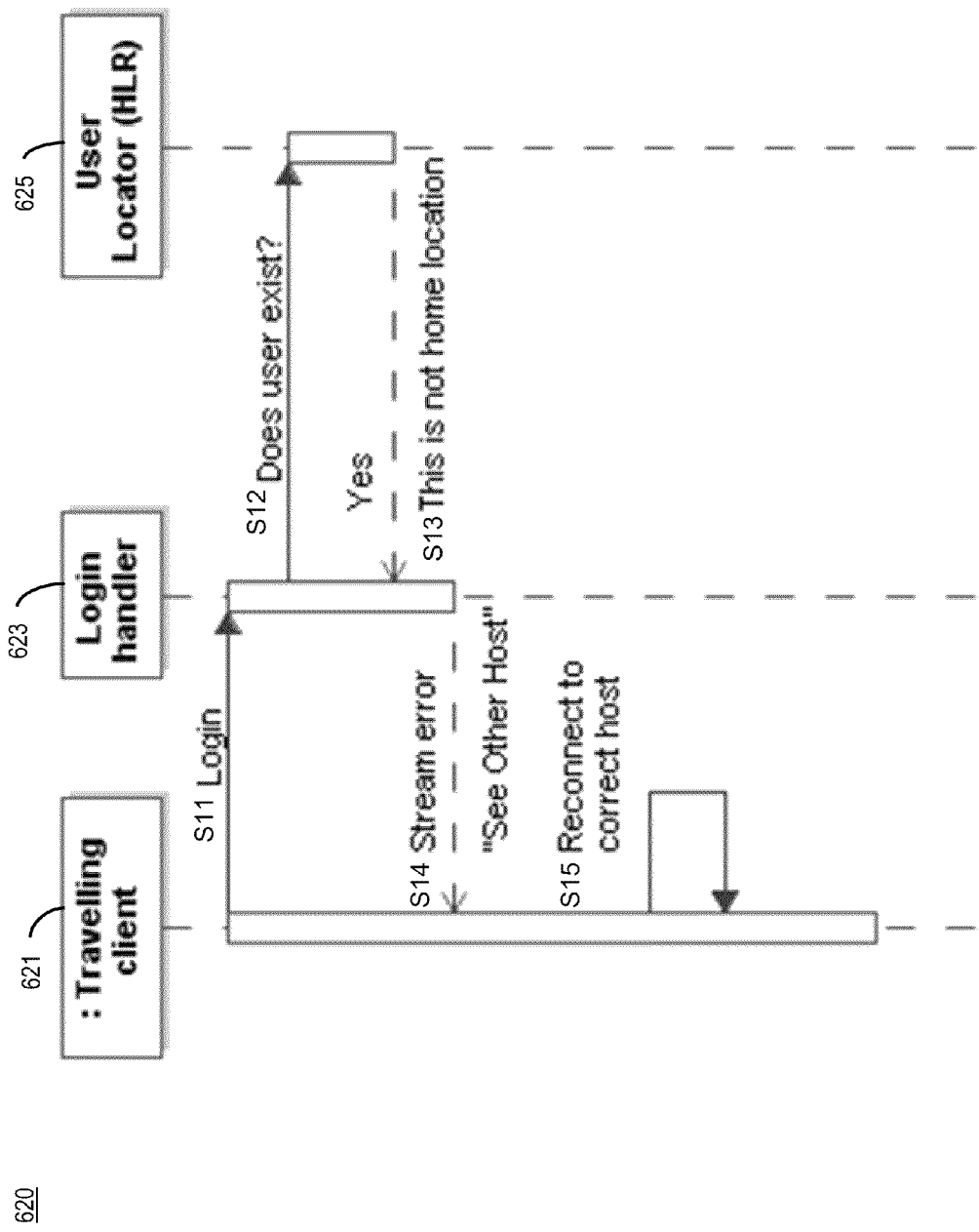

FIG. 6B is a ladder diagram 620 for a process of resolving user home locations, according to one embodiment. In this embodiment, a traveling client 621 attempts to login to the login handler 623 associated with a messaging bus 109 (step S11). The traveling client 621 is directed to a realm 103 by a DNS server and the login handler 623 is associated with the realm 103. The login handler 623 authenticates the information of the traveling client 621 and determines if the home location of the login handler 623 is the home location of the traveling client 621. The login handler 623 looks up an identifier associated with the traveling client 621 in a home location registry 625. The home location registry 625 indicates that the user exists (step S12), but the location of the login handler 623 is not the home location of the traveling client 621 (step S13). The login handler 623 notifies the traveling client 621 of the error using a stream error "see-other-host" and points the traveling client 621 to the home cluster of the traveling client 621 (step S14). The traveling client 621 can then cache the home cluster address, as in step S15.

Figure 6C:
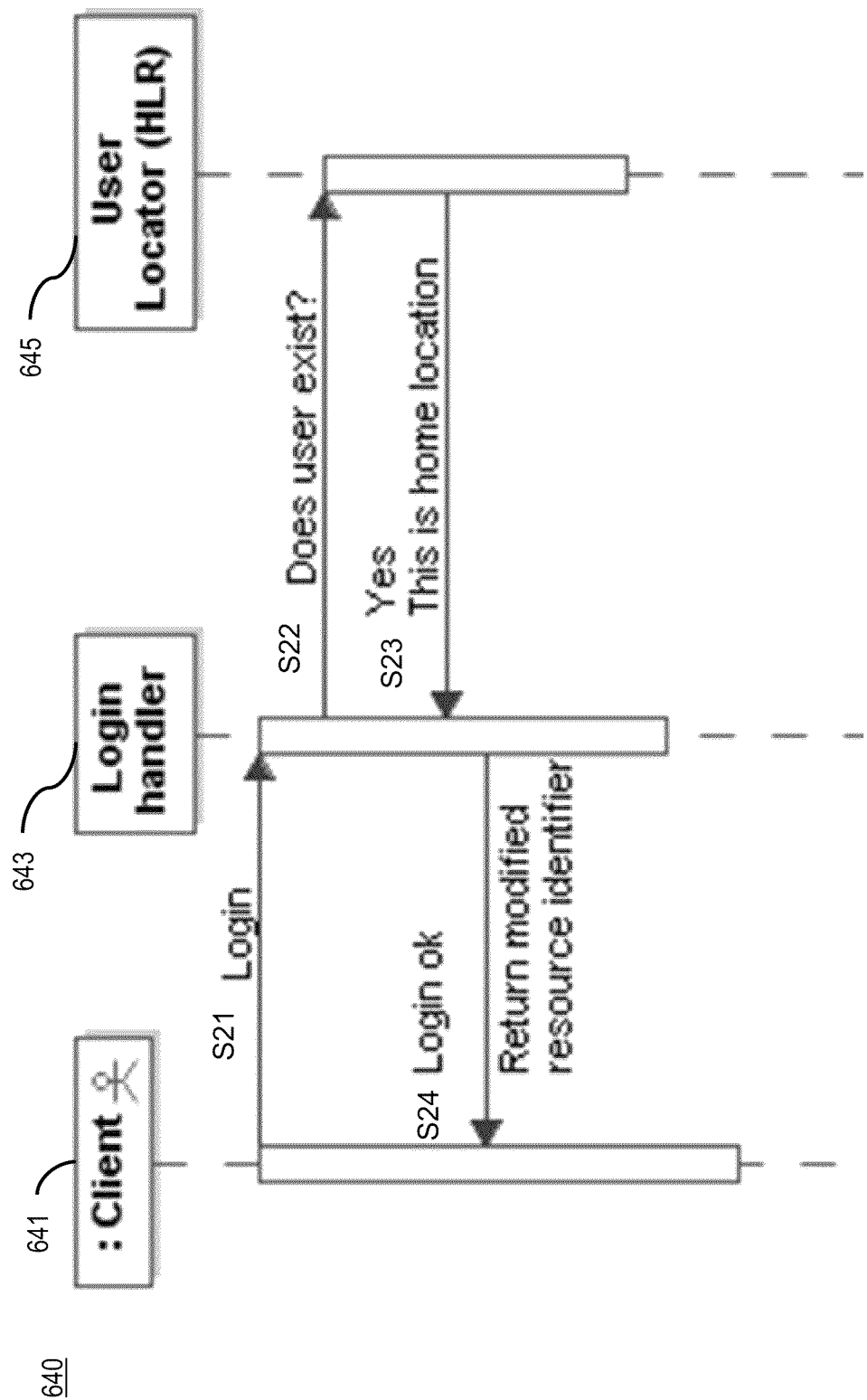

FIG. 6C is a ladder diagram 640 for a process of resolving user home locations, according to one embodiment. In step S21, the client 641 logs into a login handler 643 associated with a messaging bus 109. The login handler queries a home location registry 645 to determine the home location of the client 641. The client 641 can be identified by a client identifier. In step S22, the home location registry 645 determines that the client 641 exists and returns that the login handler 643 location is the home location of the client 641 (step S23). The login is then completed by the login handler 643 and a login session is created in a session database 113. During the login process, the login handler 643 modifies the client identifier by appending the home location to the client identifier, per step S24. In one embodiment, the client identifier modified is a resource identifier. In another embodiment, the appended modification comprises five characters. The modified identifier is then returned to the client 641. The client 641 can then use the modified identifier when communicating using the messaging bus 109 during the session. In one embodiment, an endpoint (e.g., another client, a service, or other point receiving a message from the messaging bus 109) communicating with the client 641 can receive the modified identifier during a session. In one embodiment, the endpoint can use the modified identifier to determine a home node for the next communication connection.

The processes described herein for providing message routing optimization without resolving home location via a home location registry may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 7:
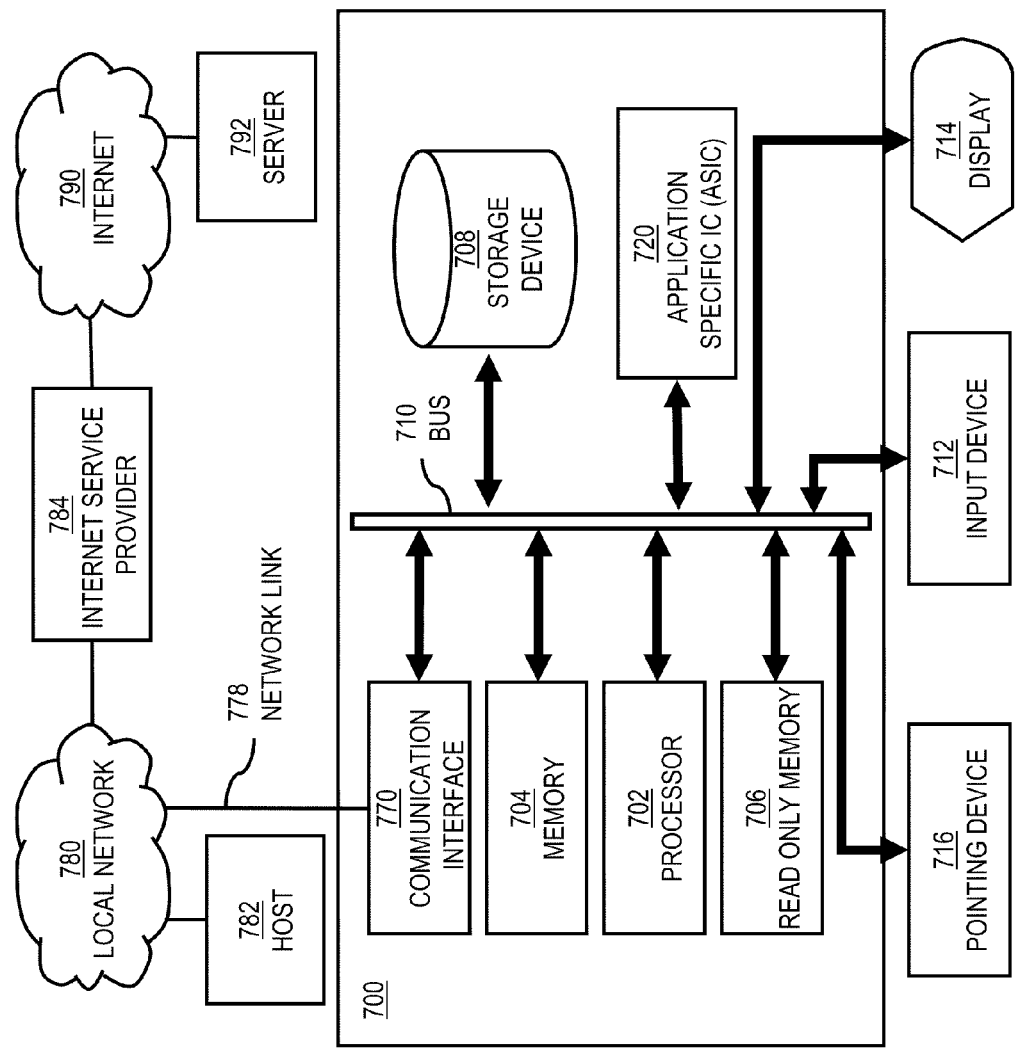
FIG. 7 is a diagram of hardware that can be used to implement an embodiment of the invention.

FIG. 7 illustrates a computer system 700 upon which an embodiment of the invention may be implemented. Computer system 700 is programmed (e.g., via computer program code or instructions) to optimize message routing as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 710 includes one or more parallel conductors of information so that information is transferred quickly among devices coupled to the bus 710. One or more processors 702 for processing information are coupled with the bus 710.

A processor 702 performs a set of operations on information as specified by computer program code related to optimizing message routing. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 700 also includes a memory 704 coupled to bus 710. The memory 704, such as a random access memory (RAM) or other dynamic storage device, stores information including processor instructions for optimizing message routing. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for optimizing message routing, is provided to the bus 710 for use by the processor from an external input device 712, such as a keyboard containing alphanumeric keys operated by a human user, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT) or a liquid crystal display (LCD), or plasma screen or printer for presenting text or images, and a pointing device 716, such as a mouse or a trackball or cursor direction keys, or motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of application specific ICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 105 for sending messages to the UE 101.

The term computer-readable medium is used herein to refer to any medium that participates in providing information to processor 702, including instructions for execution. Such a medium may take many forms, including, but not limited to, non-volatile media, volatile media and transmission media. Non-volatile media include, for example, optical or magnetic disks, such as storage device 708. Volatile media include, for example, dynamic memory 704. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Figure 8:
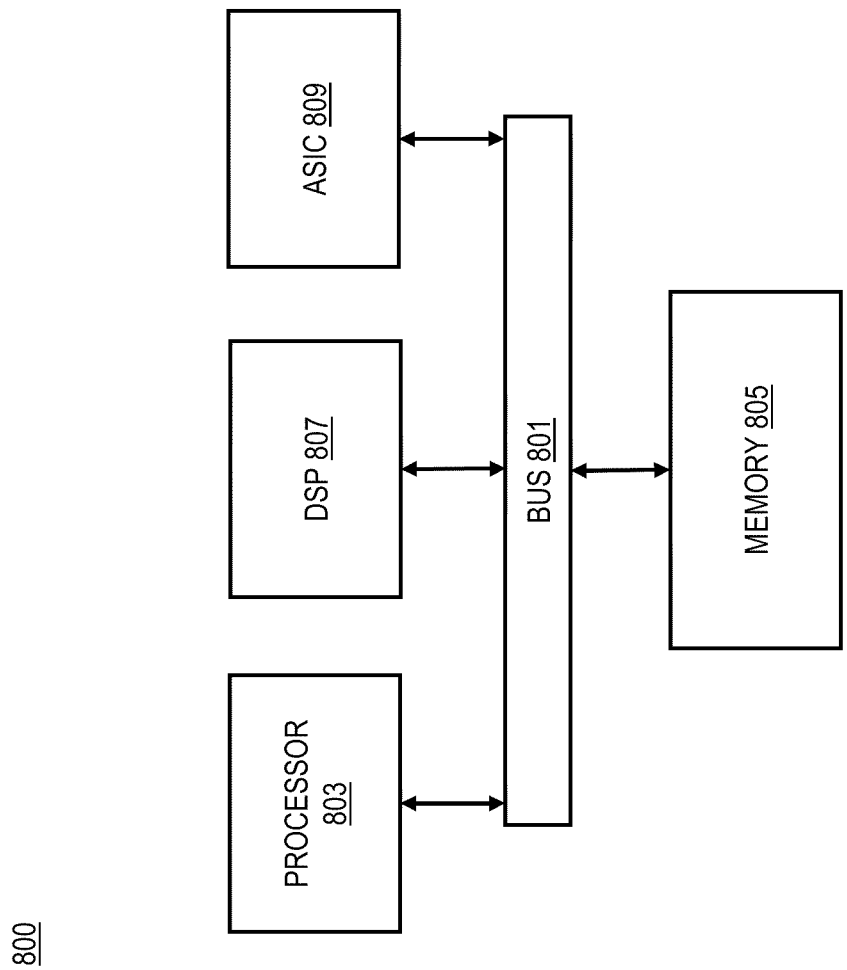
FIG. 8 is a diagram of a chip set that can be used to implement an embodiment of the invention.

FIG. 8 illustrates a chip set 800 upon which an embodiment of the invention may be implemented. Chip set 800 is programmed to optimize message routing as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to optimize message routing. The memory 805 also stores the data associated with or generated by the execution of the inventive steps.

Figure 9:
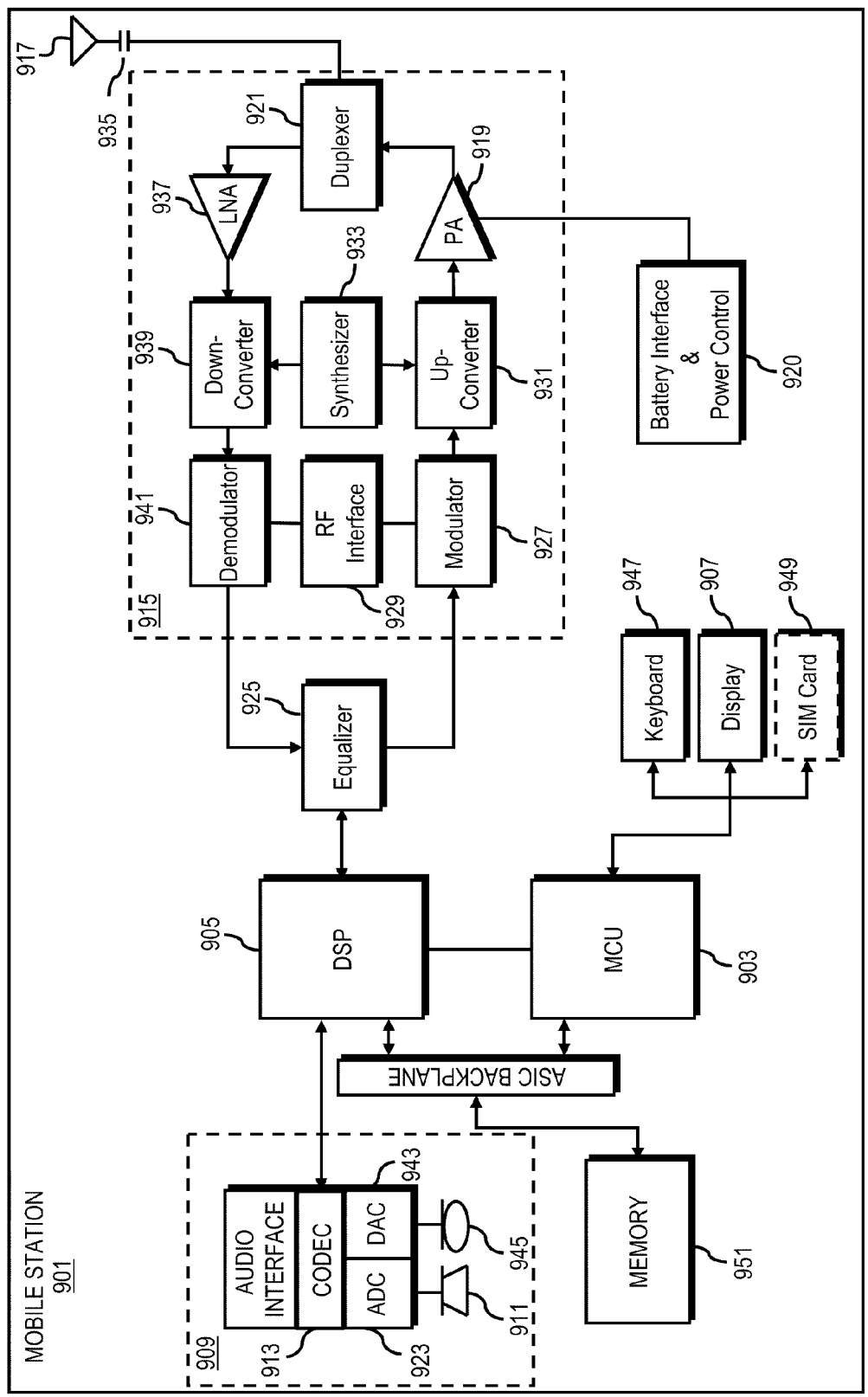
FIG. 9 is a diagram of a mobile station (e.g., handset) that can be used to implement an embodiment of the invention.

FIG. 9 is a diagram of exemplary components of a mobile station (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile station functions that offer automatic contact matching. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile station 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903—which can be implemented as a Central Processing Unit (CPU) (not shown).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile station 901 to optimize message routing. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the station. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile station 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable storage medium known in the art. The memory device 951 may be, but not limited to, a single memory, CD, DVD, ROM, RAM, EEPROM, optical storage, or any other non-volatile storage medium capable of storing digital data.

An optionally incorporated SIM card 949 carries, for instance, important information, such as the cellular phone number, the carrier supplying service, subscription details, and security information. The SIM card 949 serves primarily to identify the mobile station 901 on a radio network. The card 949 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

The following patent applications are incorporated herein by reference in their entireties: co-pending U.S. Patent Application (NC69561US P2605US00) filed Jun. 18, 2009, entitled "Method and Apparatus for Message Routing to Services," and co-pending U.S. Patent Application (NC69561US P2606US00) filed Jun. 18, 2009, entitled "Method and Apparatus for Message Routing Between Clusters using Proxy Channels."

What is claimed is:

1. A method comprising:
   receiving a login request from a user equipment associated with a resource identifier, wherein the user equipment is configured to operate within a network including a plurality of clusters;
   modifying the resource identifier of the user equipment to include home cluster information indicating a corresponding one of the clusters serving the user equipment; and
   causing, at least in part, a sending of the modified resource identifier to an endpoint via the login request, wherein the modified resource identifier is parsed to determine the home location of the user equipment.

2. A method of claim 1, further comprising:
   causing, at least in part, a point-to-point communication session between the user equipment and the endpoint via the login request.

3. A method of claim 2, wherein the home cluster information comprises a site identifier and a cluster identifier.

4. A method of claim 3, wherein the home cluster information further comprises a node identifier.

5. A method of claim 1, further comprising selecting a home cluster for a next connection between the user equipment and the endpoint based on the modified resource identifier.

6. A method of claim 1, wherein the resource identifier is associated with multiple communication sessions between the user equipment and multiple endpoints.

7. A method of claim 1, wherein the modifying step further includes:
   identifying a home cluster associated with a user of the user equipment by querying a first home locator of a plurality of home locators; and
   appending the home cluster information associated with the home cluster to the resource identifier.

8. A method of claim 7, further comprising:
   replicating an update in the plurality of home locators, if the first home locator is updated.

9. An apparatus comprising:
   at least one processor; and
   at least one memory including computer program code for one or more programs, the at least one memory and the computer program code configured to, with the at least one processor, cause the apparatus to perform at least the following:

receive a login request from a user equipment associated with a resource identifier, wherein the user equipment is configured to operate within a network including a plurality of clusters;

modify the resource identifier of the user equipment to include home cluster information indicating a corresponding one of the clusters serving the user equipment; and cause, at least in part, a sending of the modified resource identifier to an endpoint via the login request, wherein the modified resource identifier is parsed to determine the home location of the user equipment.

10. An apparatus of claim 9, wherein the apparatus is further caused to:

cause, at least in part, a point-to-point communication session between the user equipment and the endpoint via the login request.

11. An apparatus of claim 10, wherein the home cluster information comprises a site identifier and a cluster identifier.

12. An apparatus of claim 11, wherein the home cluster information further comprises a node identifier.

13. An apparatus of claim 9, wherein the apparatus is further caused to select a home cluster for a next connection between the user equipment and the endpoint based on the modified resource identifier.

14. An apparatus of claim 9, wherein the resource identifier is associated with multiple communication sessions between the user equipment and multiple endpoints.

15. An apparatus of claim 9, wherein the apparatus is further caused to:

identify a home cluster associated with a user of the user equipment by querying a first home locator of a plurality of home locators; and append the home cluster information associated with the home cluster to the resource identifier.

16. An apparatus of claim 15, wherein the apparatus is further caused to replicate an update in the plurality of home locators if the first home locator is updated.

17. A computer-readable storage medium carrying one or more sequences of one or more instructions which, when executed by one or more processors, cause an apparatus to perform at least the following:

receive a login request from a user equipment associated with a resource identifier, wherein the user equipment is configured to operate within a network including a plurality of clusters;

modify the resource identifier of the user equipment to include home cluster information indicating a corresponding one of the clusters serving the user equipment; and cause, at least in part, a sending of the modified resource identifier to an endpoint via the login request, wherein the modified resource identifier is parsed to determine the home location of the user equipment.

18. A computer-readable storage medium of claim 17, wherein the apparatus is further caused to:

cause, at least in part, a point-to-point communication session between the user equipment and the endpoint via the login request.

* * * * *